United States Patent [19]
Bedard et al.

[11] Patent Number: 5,192,722
[45] Date of Patent: * Mar. 9, 1993

[54] HIGH DENSITY LEUCITE/POLLUCITE BASED CERAMICS FROM ZEOLITE

[75] Inventors: Robert L. Bedard, Fishkill; Edith M. Flanigen, White Plains, both of N.Y.

[73] Assignee: UOP, Des Plaines, Ill.

[*] Notice: The portion of the term of this patent subsequent to Dec. 10, 2008 has been disclaimed.

[21] Appl. No.: 729,660

[22] Filed: Jul. 15, 1991

[51] Int. Cl.$^5$ .................................................. C04B 35/10
[52] U.S. Cl. .................................... 501/128; 501/153; 501/154; 502/64
[58] Field of Search ...................... 501/128, 153, 154; 502/64, 67; 423/328

[56] References Cited

U.S. PATENT DOCUMENTS

| | | | |
|---|---|---|---|
| 3,130,007 | 4/1962 | Breck | 23/113 |
| 3,938,978 | 2/1976 | Hummel | 501/31 |
| 4,503,023 | 3/1985 | Breck et al. | 423/328 |
| 4,604,366 | 8/1986 | Kaciez et al. | 501/6 |
| 4,798,536 | 1/1989 | Katz et al. | 433/212.1 |
| 4,814,303 | 3/1989 | Chowdhry et al. | 501/119 |
| 4,840,779 | 6/1989 | Cannan | 423/328 |
| 5,071,801 | 12/1991 | Bedard et al. | 502/128 |

FOREIGN PATENT DOCUMENTS

298701 1/1989 European Pat. Off. .

OTHER PUBLICATIONS

C. Hahn & K. Teuchert in *Ber. Dt. Keram. Ges.*, 57, (1980) Nos. 9-10, 208-215.

D. W. Breck, Zeolite Molecular Sieves, J. Wiley & Sons, NY (1974) 493-496.
Barrer & McCallum, *J. Chem. Soc.*, 1953 4029-4035.
Barrer & Langley, *J. Chem. Soc.*, 1958, 3804-3811.
J. D. Sherman, *Adsorption and Ion Exchange Separations*, A.I.Ch.E. Symp. Ser., 74, No. 179, 98-116, J. D. Sherman Ed., American Institute of Chemical Engineers, 1978.

*Primary Examiner*—Karl Group
*Assistant Examiner*—Alan Wright
*Attorney, Agent, or Firm*—Thomas K. McBride; Eugene I. Snyder; Frank S. Molinaro

[57] ABSTRACT

This invention relates to processes for preparing a ceramic article having as its principal crystalline phase a leucite/pollucite solid solution. The process involves the use of a zeolite to form the article. Zeolites which can be used are those that have a $SiO_2/Al_2O_3$ ratio of about 3.5 to about 7.5 such as zeolite Y. The zeolite is exchanged with potassium, rubidium and cesium, then calcined at a temperature of about 900° to about 1100° C. for a time to collapse the zeolite framework and provide an amorphous powder. Next, the amorphous powder is formed into a shaped article and the article is sintered at a temperature of about 1150° to about 1400° C. for a time of about 0.5 to about 12 hours to give a ceramic article whose principal crystalline phase is a leucite/pollucite solid solution, is substantially crack free, has less than 5% porosity, and a coefficient of thermal expansion of about $2 \times 10^{-6}$ to about $27 \times 10^{-6} °C^{-1}$. This invention also relates to the leucite/pollucite ceramic article.

11 Claims, No Drawings

HIGH DENSITY LEUCITE/POLLUCITE BASED CERAMICS FROM ZEOLITE

BACKGROUND OF THE INVENTION

Ceramic articles have many uses including catalyst supports, dental porcelain, heat exchangers, turbine blades, substrates for integrated circuits, etc. The particular ceramic which is used in a given application depends on the properties required for the given application. For example, leucite ceramics (leucite is a potassium aluminosilicate composition) can be used as dental porcelains, coatings for metals and metal/ceramic seals. A review of the importance of potassium aluminosilicate compositions in dental ceramics is given in C. Hahn and K. Teuchert in *Ber. Dt. Keram. Ges.*, 57, (1980) Nos. 9-10, 208-215. One drawback to the use of leucite in dental applications is that it is fragile and hard to repair. For this reason, dental restorations usually require a metal framework.

Another drawback to leucite in certain applications is it has a large coefficient of thermal expansion. Leucite goes through a phase change (from tetragonal to cubic) at a temperature between 400° and 600° C. which results in a unit cell volume increase of about 5%. Even at temperatures below this structural transition, leucite and its glass ceramics show relatively large thermal expansion coefficients. The prior art describes that thermal expansion in leucite glass ceramics can be varied over a somewhat narrow range by changing the ratio of leucite crystals to residual glass in the sintered ceramic. This method of thermal expansion variation is described in U.S. Pat. No. 4,604,366, which teaches that thermal expansion can be adjusted over a range of $10 \times 10^{-6}$ to $19 \times 10^{-6}$ by blending two different glass frits with two different pulverized glass ceramic powders in varying ratios.

Applicants have discovered a process by which the coefficient of thermal expansion of leucite can be varied from about $2 \times 10^{-6}$ to about $27 \times 10^{-6}$ C.$^{-1}$ in the 50° to 700° C. temperature range by introducing a pollucite phase into the leucite ceramic. Pollucite is a relatively low thermal expansion cesium-silica-alumina ceramic which has the cubic high-leucite structure at room temperature and forms a continuous series of solid solutions with leucite over the full subsolidus temperature range. See, Barrer and McCallum *J. Chem. Soc.*, 1953, 4029-4035. As the cesium level in the leucite ceramic is increased the thermal expansion coefficient decreases to a point that the leucite/pollucite assumes the high leucite cubic structure at room temperature, after which time the coefficient of expansion continues to decrease with increased cesium content.

Applicants have further discovered that addition of Rb to the Cs or Cs, K aluminosilicate ceramic allows further tailoring of thermal expansion and refractory characteristics without changing the ceramic formation process. Rubidium leucite can impart high thermal expansion characteristics in the 0°-400° C. temperature range without undergoing a sharp phase transition from low to high leucite.

The leucite/pollucite ceramic article can be made by exchanging a zeolite such as zeolite Y with potassium, rubidium and cesium and heating it at a temperature of about 1050° C. to give an amorphous powder. This amorphous powder is then formed into a desired shape and sintered at a temperature of about 1150°-1400° C. to give a leucite/pollucite ceramic article. By varying the amounts of potassium, rubidium and cesium content in the starting zeolite, one can obtain any desired leucite/pollucite solid solution. The use of a potassium, rubidium and cesium exchanged zeolite as the starting material provides a uniform distribution of these cations in the starting zeolite which in turn results in a homogeneous distribution of these cations in the ceramic article and thus yields a solid solution and not a mixture of phases. By varying the amounts of cesium, rubidium and potassium in the starting zeolite, the thermal expansion coefficient of the ceramic article can be "tuned" to whatever value is desired between the coefficients given above. Thus, the instant process greatly simplifies the control of the coefficient of thermal expansion over that found in the prior art and allows a wider range of the thermal expansion coefficient to be attained.

Although the prior art describes the preparation of ceramics from zeolites, there is no report of a process to make a dense leucite/pollucite ceramic article. For example, Barrer and Langley in *J. Chem. Soc.*, 1958, 3804-3811 conducted experiments on the reactivity of various cation-exchanged chabasites. One observation was that heating a potassium exchanged chabasite at 1100° C. for 12 hours gave a powder whose X-ray diffraction pattern was that of leucite. The authors of this paper were only interested in identifying the products obtained from the thermal treatment of cation-exchanged chabasites. There is no discussion of producing a dense leucite ceramic article from a potassium exchanged chabasite.

Other references relate to the formation of non-leucite phases. For example, D. W. Breck in ZEOLITE MOLECULAR SIEVES, John Wiley & Sons, New York (1974), pp. 493-496 states that Mg-X can be heated to form cordierite. The disclosed process involves heating the Mg-X zeolite at 1500° C. to form a glass and then heating the glass above 1000° C. to form cordierite. There is no indication that a dense ceramic article was produced.

Another reference which teaches the preparation of a cordierite based ceramic article is U.S. Pat. No. 4,814,303 to Chowdry et al. Chowdry discloses producing a monolithic anorthite, anorthite-cordierite or cordierite based ceramic article by heating the Ca, Ca/Mg and Mg forms of zeolites X, Y and A at a temperature of about 900° C. to about 1350° C. Example 33 of Chowdry discloses preparing a potassium exchanged zeolite X followed by sintering at 1000° C., thereby forming predominantly $KAlSi_2O_6$ which supposedly showed the X-ray diffraction pattern of leucite (JCPDS File No. 15-47).

European Patent Publication Number 298,701 (to Taga et al.) describes the preparation of a ceramic article having an anorthite phase from a calcium zeolite. The process involves a calcination to form an amorphous product which can then be shaped into an article and sintered at temperatures of about 850°-950° C.

U.S. Pat. No. 4,798,536 teaches the addition of potassium salts to various feldspars to produce a porcelain having a greater amount of a leucite phase and increased strength. It is evident that none of these references disclose or hint at applicants' invention.

SUMMARY OF THE INVENTION

This invention relates to a ceramic article and a process for preparing a ceramic article whose principal crystalline phase is a leucite/pollucite solid solution and to a ceramic article comprising a leucite/pollucite solid solution. Accordingly, one embodiment of the invention is a process for producing a substantially crack free ceramic article having less than 5% porosity, whose principal crystalline phase is a leucite/pollucite solid solution, and having an empirical formula expressed in terms of the metal oxides:

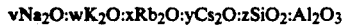

$$vNa_2O:wK_2O:xRb_2O:yCs_2O:zSiO_2:Al_2O_3$$

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the process comprising calcining a powder which is a mixture of a potassium exchanged zeolite, a rubidium exchanged zeolite and a cesium exchanged zeolite at a temperature of about 900° C. to about 1100° C. for a time effective to collapse the zeolite framework and provide an amorphous powder, the zeolite having a $SiO_2/Al_2O_3$ ratio of about 3.5 to about 7.5, the potassium exchanged zeolite having a potassium content greater than zero but less than 100% of the ion exchange capacity of the zeolite, the cesium exchanged zeolite having a cesium content greater than zero but less than 100% of the ion exchange capacity of the zeolite, the rubidium exchanged zeolite having a rubidium content greater than zero but less than 100% of the ion exchange capacity of the zeolite and the sum of the potassium, rubidium and cesium content is at least 50% of the total ion exchange capacity of the zeolites, forming the amorphous powder into a shaped article and sintering the shaped article at a temperature of about 1150° to about 1400° C., for a time of about 0.5 to about 12 hours, thereby forming said ceramic article.

Another embodiment of the invention is a substantially crack free ceramic article having less than 5% porosity, having as its principal crystalline phase a leucite/pollucite solid solution and having an empirical formula expressed in terms of the metal oxides:

$$vNa_2O:wK_2O:xRb_2O:yCs_2O:zSiO_2:Al_2O_3$$

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the ceramic article characterized in that it has a coefficient of thermal expansion of about $2\times10^{-6}$ to about $27\times10^{-6}$ °C.$^{-1}$ over the range 50° to 700° C.

Yet another embodiment is a process for producing a substantially crack free ceramic article having less than 5% porosity, whose principal crystalline phase is a leucite/pollucite solid solution and having an empirical formula expressed in terms of the metal oxides:

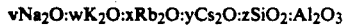

$$vNa_2O:wK_2O:xRb_2O:yCs_2O:zSiO_2:Al_2O_3$$

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the process comprising calcining a powder of a potassium, rubidium and cesium coexchanged zeolite at a temperature of about 900° C. to about 1100° C. for a time effective to collapse the zeolite framework and provide an amorphous powder, the zeolite having a $SiO_2/Al_2O_3$ ratio of about 3.5 to about 7.5, a potassium content greater than zero but less than 100% of the ion exchange capacity of the

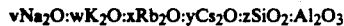

zeolite, a cesium content greater than zero but less than 100% of the ion exchange capacity of the zeolite, a rubidium content greater than zero but less than 100% of the ion exchange capacity of the zeolite and the sum of the potassium, rubidium and cesium content is at the zeolite; forming the amorphous powder into a shaped article and sintering the shaped article at a temperature of about 1150° to about 1400° C., for a time of about 0.5 to about 12 hours, thereby forming said ceramic article.

Other objects and embodiments of this invention will become more apparent in the following detailed description.

DETAILED DESCRIPTION OF THE INVENTION

As stated, this invention relates to a process for preparing ceramic articles whose principal crystalline phase is a leucite/pollucite solid solution from a potassium/rubidium/cesium exchanged zeolite, and a ceramic article comprising a leucite/pollucite solid solution. Accordingly, one necessary component of the process of this invention is a zeolite. Zeolites are well known microporous three-dimensional framework structures. In general the crystalline zeolites are formed from corner sharing $AlO_2$ and $SiO_2$ tetrahedra and are characterized as having pore openings of uniform dimensions, having a significant ion-exchange capacity and being capable of reversibly desorbing an adsorbed phase which is dispersed throughout the internal pores or voids of the crystal without displacing any atoms which make up the permanent crystal structure.

Zeolites can be represented on an anhydrous basis, by the formula

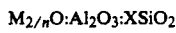

$$M_{2/n}O:Al_2O_3:XSiO_2$$

where M is a cation having the valence n and X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques.

The zeolites which can be used in this invention include any zeolite which can be synthesized with a $SiO_2/Al_2O_3$ ratio between 3.5 and 7.5. It is also necessary that the cation present in the zeolite be exchangeable with potassium, cesium, rubidium or mixtures thereof. Illustrative of the zeolites which have these properties are zeolite Y, zeolite L, zeolite LZ-210, zeolite B, zeolite omega, zeolite LZ-202, and zeolite W, zeolite LZ-210 is a zeolite Y whose silicon content has been increased by treatment with aqueous ammonium fluorosilicate $((NH_4)_2SiF_6)$. The preparation and characterization of this zeolite is described in U.S. Pat. No. 4,503,023 which is incorporated by reference. Zeolite LZ-202 is an omega-type zeolite prepared without an organic templating agent, whose preparation is disclosed in U.S. Pat. No. 4,840,779 which is incorporated by reference. Of these zeolites, zeolite Y, L, B, W, and omega are preferred.

In the description which follows, zeolite Y will be used to exemplify the process. However, this is not to be construed as limiting the invention in any way to zeolite Y.

Zeolite Y is a synthetic zeolite having the formula $Na_2O:Al_2O_3:XSiO_2$ where X ranges from about 3 to about 6. The synthesis of zeolite Y is described in U.S.

Pat. No. 3,130,007 which is incorporated by reference. The synthesis essentially entails forming a mixture of sodium aluminate, sodium silicate, colloidal silica and sodium hydroxide heating this mixture at a temperature of about 20° to 175° C. under autogenous pressure for a time sufficient to ensure complete crystallization, usually about 16 to 40 hours and isolating the product.

Two techniques are generally used to remove the sodium cation and replace it with potassium, cesium, rubidium or a mixture of potassium, rubidium and cesium. Note that zeolites L and W are usually made with potassium as the cation and thus no exchange with potassium is necessary. One technique is a multiple ion exchange with the potassium cation while the other technique involves pre-exchanging the zeolite with a cation such as $NH_4^+$ followed by ion exchange with the potassium ion.

Ion exchange is conveniently carried out by contacting the zeolite with an aqueous solution of the metal ion to be exchanged. For example, a dilute (about 1 molar) aqueous solution of potassium chloride or potassium nitrate is prepared and the pH of the solution adjusted to about 8.5 using potassium hydroxide. The volume of solution which is prepared is that amount which provides from about 5 to about 10 times the amount of potassium ion needed to fully ion exchange the sodium or other unwanted alkali metal in the zeolite.

The contacting of the potassium salt solution with the zeolite can conveniently be carried out in a batch process. Accordingly, the solution is mixed with the zeolite powder and the mixture is refluxed for about 2 hours. Next the mixture is filtered, thereby isolating the zeolite powder. This procedure is repeated with a fresh batch of solution until the potassium content is at least 50% and preferably at least 90% of the ion exchange capacity of the zeolite. The ion exchange capacity for a zeolite in units of moles/g is defined as the moles/g of aluminum in the framework when a monovalent cation is being exchanged into the zeolite. Alternatively, the potassium exchange can be carried out using a continuous process employing methods well known in the art such as placing the zeolite in a column and flowing the potassium solution through the column or using a basket centrifuge. A continuous process has the advantage of allowing a more efficient utilization of the potassium solution.

The potassium exchanged zeolite is now exchanged with a rubidium salt such as rubidium chloride or rubidium nitrate as described for the potassium exchange. Finally, the potassium and rubidium exchanged zeolite is exchanged with a cesium salt such as cesium chloride or cesium nitrate. Although the order in which the three cations are exchanged is not critical, it is preferred to carry out the exchange in the order of the cation's selectivity for the zeolites. By selectivity is meant the affinity that the zeolite has for the particular cation. This affinity in turn is determined by how easily the cation fits into the voids or pores of the zeolites. For further details on zeolites' selectivity for cations, see J. D. Sherman, *Adsorption and Ion Exchange Separations*, A.I.Ch.E. Symp. Ser., 74, No. 179, 98–116, J. D. Sherman Ed., American Institute of Chemical Engineers, 1978. The three cations are ranked in order of increasing selectivity as follows: potassium<rubidium<cesium. If the exchanges are carried out in any other order either more exchanges or higher concentrations of the cations will have to be used to achieve the desired amount of the cation.

The respective content of potassium, cesium and rubidium in the zeolite is greater than zero but less than 100% of the ion exchange capacity of the zeolite. Additionally, the sum of the potassium, rubidium and cesium content is at least 50% and preferably at least 90% of the ion exchange capacity of the zeolite. If the zeolite contained sodium as the cation, some sodium may be left after all the exchanges. The amount of sodium is less than 50% of the ion exchange capacity of the zeolite and may be zero, that is, all the sodium has been exchanged out. As the amount of cesium increases, the coefficient of thermal expansion in the ceramic article decreases. As the amount of rubidium increases the coefficient of thermal expansion increases at low temperatures and decreases at high temperatures. Therefore, by varying the concentration of potassium, rubidium and cesium one has a process for controlling the thermal expansion coefficient of a leucite/pollucite solid solution containing ceramic article.

The potassium, rubidium and cesium exchanged zeolite Y is now calcined, i.e., heated in air, at a temperature of about 900° to about 1100° C. and preferably at about 1000° to about 1075° C. for a time of about 0.5 to about 2 hours. This calcination collapses the zeolite framework and produces an amorphous powder which, when formed into a ceramic article (a green or unsintered article) has a higher density than if the uncalcined zeolite were used. The effect of this calcination step is that cracks and warping in the finished ceramic article are minimized or eliminated, i.e., the finished article is substantially crack and warp free.

During the calcination agglomeration of the zeolite may occur. It is preferred that the calcined or amorphous powder be sieved and only the powder which goes through a 60 mesh U.S. Standard Sieve (250 micron opening) be used to prepare the ceramic powder. Of course the powder can be milled using conventional milling means such as ball milling, attrition milling, impact milling, etc. in order to reduce the particle size to 60 mesh or less. A powder with smaller particles will produce a ceramic article with fewer cracks and allow for more facile processing.

The amorphous powder is now formed into a desired shape by means well known in the art. A typical method of forming a shaped article involves placing the zeolite powder into a metal die and then pressing the powder at pressures of about 500 to about 50,000 psi (3,440 to about 344,000 kPa).

It is also desirable to add a binder to the powder as an aid in forming the shaped article. The binder may be selected from those well known in the art such as polyvinyl alcohol, and polyethylene glycol. If a binder is added, the amount which is to be added is up to about 15 weight percent of the powder.

Having formed the calcined potassium, rubidium and cesium exchanged zeolite Y into a desired shape (green article), the green article is now sintered at a temperature of about 1150° C. to about 1400° C. and preferably at a temperature of about 1200° C. to about 1300° C. for a time of about 2 to about 6 hours. The resultant ceramic article obtained after sintering has been found to have as its principal crystalline phase a leucite/pollucite solid solution. By principal is meant that at least 90% of the crystalline phase of the article is low or high leucite, or a leucite/pollucite solid solution. The ceramic article which is obtained is substantially crack free and has less than 5% porosity. By substantially crack-free is meant that no cracks are visible to the naked eye. Porosity can be measured by conventional techniques such as microstructure analysis by Scanning Electron Microscopy or Transmission Electron Microscopy.

As stated, the presence of potassium or rubidium in the zeolite leads to the formation of the low-leucite phase while the presence of cesium leads to the formation of the pollucite phase (high-leucite) so that one obtains a leucite/pollucite solid solution. By varying the amount of pollucite in the article, one can vary the coefficient of thermal expansion over a range of about $2 \times 10^{-6}$ to about $27 \times 10^{-6} °C.^{-1}$ in the temperature range 50° to 700° C.

Instead of using one zeolite that has been exchanged with potassium, rubidium and cesium, one can use three zeolite powders (either the same structure type or different structure type), one exchanged with only potassium, one exchanged with only rubidium and one exchanged with only cesium and blending the three zeolite powders to achieve the desired ratio of potassium, rubidium and cesium which leads to the desired ratio of leucite and pollucite. The amounts of potassium, rubidium and cesium present are the same as in the coexchanged case. Although both methods can be used, they do not necessarily give the same results. Thus, it is preferred that one zeolite powder that contains potassium, rubidium and cesium be used.

The leucite/pollucite ceramic article can be described in terms of the metal oxides by the empirical formula

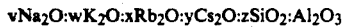
$vNa_2O:wK_2O:xRb_2O:yCs_2O:zSiO_2:Al_2O_3$ where v is less than 0.5, w varies from about 0.01 to about 0.99, x varies from about 0.01 to about 0.99, y varies from about 0.99 to about 0.01 and z varies from about 3.5 to about 7.5 and $v+w+x+y=1$. The ceramic article is characterized in that it has a coefficient of thermal expansion of about $2 \times 10^{-6}$ to about $27 \times 10^{-6} °C.^{-1}$ over the range 50° to 700° C., has less than 5% porosity. Finally, the principal crystalline phase of the ceramic article is a leucite/pollucite solid solution. The leucite/pollucite ceramic articles of this invention have several uses including dental porcelains, metal/ceramic seals where the coefficient of thermal expansion can be graded in the transition zone between the metal and ceramic.

In order to fully illustrate the instant invention, the following examples are set forth. It is to be understood that the examples are only by way of illustration and are not intended as an undue limitation on the broad scope of the invention as set forth in the appended claims.

EXAMPLE 1

This example shows the preparation of potassium exchanged zeolite Y from NaY zeolite. In a container 223.7 grams of KCl were dissolved in 3 liters of distilled water and the pH of the solution was adjusted to 8.5 by adding a small amount of KOH. To this solution there were added 150 g of NaY zeolite, prepared according to the procedure in U.S. Pat. No. 3,130,007, whose chemical analysis was: 19.52 wt. % $Al_2O_3$, 41.45 wt. % $SiO_2$, 12.82 wt. % $Na_2O$ and 26.21 wt. % LOI. The chemical formula expressed as ratio of oxides on an anhydrous basis was determined to be: 1.08 $Na_2O$:1.00 $Al_2O_3$:3.61 $SiO_2$. The resulting slurry was heated to reflux while stirring for two hours.

The zeolite powder was isolated by filtration, after which the powder was reexchanged three more times, each time with equal amounts of freshly prepared KCl solution (adjusted to pH 8.5 as above), followed by another filtration. Finally the powder was washed with 9 liters of distilled water. The resulting powder was dried at room temperature. Elemental analysis showed the presence of: 20.2 wt. % $Al_2O_3$, 41.0 wt. % $SiO_2$, 0.188 wt. % $Na_2O$, 17.0 wt. % $K_2O$ and 22.2 wt. % LOI. The chemical formula expressed as the ratio of the oxides on an anhydrous basis was determined to be: 0.02 $Na_2O$:0.91 $K_2O$:1.0 $Al_2O_3$:3.4 $SiO_2$.

EXAMPLE 2

A 53.3 lb. sample of LZ-Y62 (ammonium exchanged Y zeolite with nominally 2.7 wt. % residual $Na_2O$ and $SiO_2/Al_2O_3$ about 5; obtained from UOP) was slurried in a solution of 360 lb. of $H_2O$ and 40 lb. of $NH_4Cl$. The mixture was refluxed for 1 hour, then filtered in a filter press, after which the powder was left in the filter press for the remainder of the ion exchanges. A new solution of 40 lb. of $NH_4Cl$ in 360 lb of $H_2O$ was prepared and heated to reflux in a kettle which was fitted with piping to the filter press. The hot solution was circulated through the filter press containing the zeolite powder for two hours, while recycling through the heated kettle in order to keep the solution as close to reflux temperature as possible. Three more exchanges were carried out by the above circulation procedure, each time with equal amounts of freshly prepared $NH_4Cl$ solution. Finally, the zeolite powder, while still in the filter press, was washed with about 75 gallons of $H_2O$. The resulting wet powder was removed from the filter press and dried overnight at 100° C. Elemental analysis showed the presence of: 17.8 wt. % $Al_2O_3$, 51.7 wt. % $SiO_2$, 8.7 wt. % $(NH_4)_2O$, 0.31 wt. % $Na_2O$, 29.7 wt. % LOI. The chemical formula expressed as the ratio of the oxides on an anhydrous basis was determined to be: 0.03 $Na_2O$: 1.0 $Al_2O_3$: 4.9 $SiO_2$: 0.96 $(NH_4)_2O$

EXAMPLE 3

A 500 g. portion of ammonium exchanged zeolite Y prepared in Example 2, was exchanged as follows. In a container 1011.1 g of $KNO_3$ was dissolved in 10 liters of $H_2O$, and the pH was adjusted to about 9 with a small amount of KOH. The zeolite powder was slurried in the solution and then the mixture was heated with stirring, to reflux for 2 hours. The zeolite powder was isolated by filtration, after which the powder was reexchanged three more times, each time with equal amounts of freshly prepared $KNO_3$ solution (adjusted to pH 9 as above).

Finally, the powder was washed with 15 liters of distilled water and dried in air at room temperature. Elemental analysis showed the following composition: 16.4 wt. % $Al_2O_3$, 48.0 wt. % $SiO_2$, 14.5 wt. % $K_2O$, and 21.0 wt. % LOI, which can be expressed as the following ratio of anhydrous oxides: 0.96 $K_2O$: 1.0 $Al_2O_3$: 5.0 $SiO_2$.

EXAMPLE 4

This example shows the preparation of a cesium and potassium exchanged zeolite. A 100 gram portion of a potassium exchanged zeolite Y, prepared as in Example 3, was exchanged with cesium as follows. In a container 331.35 g of cesium nitrate was dissolved in 1.7 liters of water, then the pH was adjusted to 8 with a small amount of $CsCO_3$. The zeolite powder was slurried in the solution and the mixture was heated with stirring to reflux for two hours. The powder was isolated by filtration, after which the powder was reexchanged two more times as above, each time with equal amounts of freshly prepared pH adjusted CsNO$_3$ solutions. The final powder was isolated by filtration, washed with 15 liters of deionized water, and dried in air at room temperature. Elemental analysis revealed the presence of: 14.1 wt. % Al$_2$O$_3$, 41.4 wt. % SiO$_2$, 3.01 wt. % K$_2$O, 27.2 wt. % Cs$_2$O, and 15.8 wt. % LOI, which can be expressed in anhydrous oxide ratios as 0.70 Cs$_2$O: 0.23 K$_2$O: 1.0 Al$_2$O$_3$: 4.95 SiO$_2$.

EXAMPLE 5

A 25 gram portion of zeolite Y of Example 3 was exchanged with rubidium as follows. In a container 60.46 g of RbCl was dissolved in 500 mL of H$_2$O, and the pH was adjusted to 11 with RbOH. The zeolite powder was slurried in the solution and then the mixture was heated, with stirring, to reflux for 2 hours. The zeolite powder was isolated by filtration, after which the powder was reexchanged two more times, each time with equal amounts of freshly prepared RbCl solution (adjusted to pH 11 as above).

Finally, the powder was washed with 4 liters of distilled water and dried in air at room temperature. Elemental analysis showed the following composition: 14.6 wt. % Al$_2$O$_3$, 42.3 wt. % SiO$_2$, 23.39 wt. % Rb$_2$O, 0.21 wt. % Na$_2$O, 0.85 wt. % K$_2$O and 18.1 wt. % LOI, which can be expressed as the following ratio of anhydrous oxides: 0.02 Na$_2$O: 0.06 K$_2$O: 0.87 Rb$_2$O: 1.0 Al$_2$O$_3$: 4.9 SiO$_2$.

EXAMPLE 6

A 20 gram sample of the rubidium and potassium exchanged zeolite of Example 5 can be exchanged with cesium in the following way. Cesium nitrate can be dissolved in 100 mL water and the pH adjusted to 8 with small amounts of CsOH. The zeolite powder is slurried in the solution and the mixture is heated to reflux for two hours. The powder is isolated by filtration and washed with 1 liter of distilled water. The amount of cesium dissolved in the initial ion exchange solution is sufficient to provide 19 wt. % Cs$_2$O in the final powder, giving concentrations of individual components in the product (expressed in the anhydrous oxide form): 0.02 Na$_2$O: 0.04 K$_2$O: 0.45 Rb$_2$O: 0.40 Cs$_2$O: 1.0 Al$_2$O$_3$: 4.9 SiO$_2$.

EXAMPLE 7

About 15 grams of cesium, rubidium, potassium exchanged zeolite Y, made in Example 5, is heated as a loose powder to 1050° C. for 1 hour. The powder is passed through a standard 60 mesh screen to remove large agglomerates, then a 82.55×9.5 mm rectangular bar is made from the calcined, meshed powder in a steel die. The bar is heated at 10° C. per minute to 1050° C., then 4° C. per minute to 1250° C., then held at 1250° C. for 4 hours. The resulting bar, which is crack free, is cut with a diamond cutoff wheel to a length of 2.0 inches. The measured density of the two inch bar is 2.65 g/cc. The short piece which is cut off is ground into a fine powder and can be analyzed by X-ray diffraction. The X-ray pattern would reveal the presence of high leucite solid solution.

EXAMPLE 8

A 100 g portion of the potassium exchanged zeolite of Example 1 can be exchanged with rubidium as described in Example 4. The composition of the final product expressed as a ratio of oxides on an anhydrous basis is expected to be: 0.02 Na$_2$O: 0.40 K$_2$O: 0.53 Rb$_2$O: 1 Al$_2$O$_3$: 3.4 SiO$_2$.

EXAMPLE 9

The product of Example 8 can be exchanged with cesium as described in Example 5 to give a product with an expected composition expressed as a ratio of oxides on an anhydrous basis of: 0.02 Na$_2$O: 0.2 K$_2$O: 0.35 Rb$_2$O: 0.4 Cs$_2$O: 1 Al$_2$O$_3$: 3.4 SiO$_2$.

EXAMPLE 10

About 15 grams of the cesium, rubidium, potassium exchanged zeolite Y of Example 9 can be processed as described in Example 7 which would provide a ceramic article with an expected density of about 2.6 g/cc and having an X-ray diffraction pattern characteristic of high leucite solid solution.

We claim as our invention:

1. A substantially crack free ceramic article having less than 5% porosity, having as its principal crystalline phase a leucite/pollucite solid solution and having an empirical formula expressed in terms of the metal oxides:

$$vNa_2O:wK_2O:xRb_2O:yCs_2O:zSiO_2:Al_2O_3$$

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the ceramic article characterized in that it has a coefficient of thermal expansion of about $2 \times 10^{-6}$ to about $27 \times 10^{-6}$°C.$^{-1}$ over the range 50° to 700° C.

2. A process for producing a substantially crack free ceramic article having less than 5% porosity, whose principal crystalline phase is a leucite/pollucite solid solution, and having an empirical formula expressed in terms of the metal oxides:

$$vNa_2O:wK_2O:xRb_2O:yCs_2O:zSiO_2:Al_2O_3$$

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the process comprising calcining a powder which is a mixture of a potassium exchanged zeolite, a rubidium exchanged zeolite and a cesium exchanged zeolite at a temperature of about 900° C. to about 1100° C. for a time effective to collapse the zeolite framework and provide an amorphous powder, the zeolite having a SiO$_2$/Al$_2$O$_3$ ratio of about 3.5 to about 7.5, the potassium exchanged zeolite having a potassium content greater than zero but less than 100% of the ion exchange capacity of the zeolite, the cesium exchanged zeolite having a cesium content greater than zero but less than 100% of the ion exchange capacity of the zeolite, the rubidium exchanged zeolite having a rubidium content greater than zero but less than 100% of the ion exchange capacity of the zeolite and the sum of the potassium, rubidium and cesium content is at least 50% of the total ion exchange capacity of the zeolites, forming the amorphous powder into a shaped article and sintering the shaped article at a temperature of about 1150° to about 1400° C., for a time of about 0.5 to about 12 hours, thereby forming said ceramic article.

3. The process of claim 2 where the sintering is carried out at a temperature of about 1200° to about 1300° C.

4. The process of claim 2 where the zeolite is selected from the group consisting of zeolite Y, zeolite B, zeolite L, zeolite W and zeolite omega.

5. The process of claim 4 where the zeolite is zeolite Y.

6. The process of claim 2 where the sum of the potassium, rubidium and cesium concentration is at least 90% of the total ion exchange capacity of the zeolites.

7. A process for producing a substantially crack free ceramic article having less than 5% porosity, whose principal crystalline phase is a leucite/pollucite solid solution and having an empirical formula expressed in terms of the metal oxides:

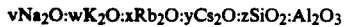

where v is less than 0.5, w varies from about 0.01 to about 0.99, x varies from about 0.01 to about 0.99, y varies from about 0.99 to about 0.01, z varies from about 3.5 to about 7.5 and $v+w+x+y=1$, the process comprising calcining a powder of a potassium, rubidium and cesium coexchanged zeolite at a temperature of about 900° C. to about 1100° C. for a time effective to collapse the zeolite framework and provide an amorphous powder, the zeolite having a $SiO_2/Al_2O_3$ ratio of about 3.5 to about 7.5, a potassium content greater than zero but less than 100% of the ion exchange capacity of the zeolite, a cesium content greater than zero but less than 100% of the ion exchange capacity of the zeolite, a rubidium content greater than zero but less than 100% of the ion exchange capacity of the zeolite and the sum of the potassium, rubidium and cesium content is at least 50% of the total ion exchange capacity of the zeolite; forming the amorphous powder into a shaped article and sintering the shaped article at a temperature of about 1150° to about 1400° C., for a time of about 0.5 to about 12 hours, thereby forming said ceramic article.

8. The process of claim 7 where the sintering is carried out at a temperature of about 1200° to about 1300° C.

9. The process of claim 7 where the zeolite is selected from the group consisting of zeolite Y, zeolite B, zeolite L, zeolite W and zeolite omega.

10. The process of claim 9 where the zeolite is zeolite Y.

11. The process of claim 7 where the sum of the potassium, rubidium and cesium concentration is at least 90% of the total ion exchange capacity of the zeolite.

* * * * *